(12) United States Patent
Li et al.

(10) Patent No.: US 12,236,039 B2
(45) Date of Patent: Feb. 25, 2025

(54) TOUCH PANEL AND ELECTRONIC DEVICE

(71) Applicant: HKC CORPORATION LIMITED, Guangdong (CN)

(72) Inventors: Wang Li, Guangdong (CN); Haijiang Yuan, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/329,026

(22) Filed: Jun. 5, 2023

(65) Prior Publication Data
US 2024/0103660 A1    Mar. 28, 2024

(30) Foreign Application Priority Data
Sep. 22, 2022  (CN) .......................... 202211154675.2

(51) Int. Cl.
*G06F 3/041*   (2006.01)

(52) U.S. Cl.
CPC ................. *G06F 3/04164* (2019.05)

(58) Field of Classification Search
CPC .... G06F 3/04164; G06F 3/041; G06F 3/0443; G06F 3/0446; G06F 3/0448; G06F 3/0412; G02F 1/13338; H10K 59/40
See application file for complete search history.

(56) References Cited

U.S. PATENT DOCUMENTS

| | | | |
|---|---|---|---|
| 8,502,796 B1 * | 8/2013 | Yilmaz | G06F 3/04164 345/173 |
| 9,207,814 B2 * | 12/2015 | Yilmaz | G06F 3/0445 |
| 9,652,102 B2 * | 5/2017 | Kuo | G06F 3/0448 |
| 9,678,612 B2 * | 6/2017 | Liu | G06F 3/0448 |
| 10,895,938 B2 * | 1/2021 | Xie | G06F 3/044 |
| 11,656,727 B2 * | 5/2023 | Shu | G06F 3/0445 345/173 |

(Continued)

FOREIGN PATENT DOCUMENTS

| CN | 101833404 A | 9/2010 |
|---|---|---|
| CN | 107256106 A | 10/2017 |

(Continued)

OTHER PUBLICATIONS

The first office action issued in corresponding CN application No. 202211154675.2 dated Nov. 3, 2022.

(Continued)

*Primary Examiner* — William Lu
(74) *Attorney, Agent, or Firm* — HAUPTMAN HAM, LLP

(57) ABSTRACT

A touch panel and an electronic device are provided in the disclosure. The touch panel includes multiple touch units spaced apart from each other. Each touch unit includes a driving electrode and detection electrodes. The driving electrode includes a first driving branch and multiple second driving branches spaced apart from each other. The multiple second driving branches are connected with the first driving branch. Two adjacent second driving branches and the first driving branch define at least one receiving space. Each receiving space receives at least one of the detection electrodes. Each detection electrode is electrically connected with a touch-detection signal line, and different detection electrodes are electrically connected with different touch-detection signal lines, respectively.

20 Claims, 10 Drawing Sheets

(56) References Cited

U.S. PATENT DOCUMENTS

| | | | | |
|---|---|---|---|---|
| 2003/0019669 | A1* | 1/2003 | Toda | G06F 3/0436 178/18.04 |
| 2011/0291982 | A1* | 12/2011 | Hsieh | G06F 3/0443 345/173 |
| 2012/0319974 | A1* | 12/2012 | Kim | G06F 3/0446 345/173 |
| 2013/0021296 | A1* | 1/2013 | Min | G06F 3/0448 345/173 |
| 2013/0081869 | A1* | 4/2013 | Kim | G06F 3/0443 29/825 |
| 2013/0300707 | A1* | 11/2013 | Hershman | G06F 3/0443 345/174 |
| 2014/0054156 | A1* | 2/2014 | Chang | H03K 17/9622 200/600 |
| 2014/0078080 | A1* | 3/2014 | Kim | G06F 3/0445 345/173 |
| 2014/0139481 | A1* | 5/2014 | Han | G06F 3/0448 345/174 |
| 2015/0028894 | A1* | 1/2015 | Sleeman | G06F 3/0443 324/662 |
| 2016/0041654 | A1* | 2/2016 | Bulea | G06F 3/041 345/174 |
| 2017/0023817 | A1* | 1/2017 | Hayashi | G06F 3/0445 |
| 2017/0228068 | A1* | 8/2017 | Pu | G06F 3/04164 |
| 2017/0287992 | A1* | 10/2017 | Kwak | G06F 1/1637 |
| 2018/0046312 | A1* | 2/2018 | Haque | G06F 3/0448 |
| 2018/0224964 | A1* | 8/2018 | Church | G06F 3/047 |
| 2020/0043874 | A1* | 2/2020 | Sira | H01L 23/5223 |
| 2021/0096697 | A1* | 4/2021 | Do | G06F 3/0447 |
| 2021/0373711 | A1* | 12/2021 | Smith | G06F 3/0412 |
| 2024/0077981 | A1* | 3/2024 | Gogte | G06F 3/04164 |

FOREIGN PATENT DOCUMENTS

| | | |
|---|---|---|
| CN | 110007804 A | 7/2019 |
| CN | 111198612 A | 5/2020 |
| CN | 111651093 A | 9/2020 |
| CN | 112181210 A | 1/2021 |
| CN | 212624007 U | 2/2021 |
| CN | 114625273 A | 6/2022 |
| GB | 2559574 A | 8/2018 |
| TW | M510495 U | 10/2015 |

OTHER PUBLICATIONS

The second office action issued in corresponding CN application No. 202211154675.2 dated Nov. 22, 2022.

Notice of allowance issued in corresponding CN application No. 202211154675.2 dated May 29, 2023.

\* cited by examiner

TOUCH PANEL AND ELECTRONIC DEVICE

CROSS-REFERENCE TO RELATED APPLICATIONS

This application claims priority under 35 U.S.C. § 119(a) to Chinese Patent Application No. 202211154675.2, filed Sep. 22, 2022, the entire disclosure of which is incorporated herein by reference.

TECHNICAL FIELD

This disclosure relates to the field of touch technology, and in particular, to a touch panel and an electronic device.

BACKGROUND

At present, most electronic devices can display images in response to touch operations, and touch panels, as a major application component in electronic devices, are one of important research directions in the field of touch technology.

The in-cell technology for touch panels has a significantly bright future, breaking through the conventional on-cell technology. In the in-cell technology, a touch structure is placed in a screen, so that a display panel can be further thinner. However, in most existing in-cell touch solutions, a single-layer self-capacitive touch structure is adopted, a common electrode is used as a touch pattern, and a metal layer is added for touch signal traces, resulting in that a touch panel of such self-capacitive touch structure has a low touch response speed and high power consumption. Therefore, how to improve a touch response speed of the touch panel and reduce power consumption of the touch panel becomes a technical problem to-be-solved.

SUMMARY

A touch panel and an electronic device are provided in the disclosure.

In a first aspect, a touch panel is provided in the disclosure. The touch panel includes multiple touch units spaced apart from each other. Each of the multiple touch units includes a driving electrode and detection electrodes. The driving electrode includes a first driving branch and multiple second driving branches spaced apart from each other. The multiple second driving branches are connected with the first driving branch. Each two adjacent second driving branches in the multiple second driving branches and the first driving branch define at least one receiving space. Each receiving space receives at least one of the detection electrodes. Each detection electrode is electrically connected with a touch-detection signal line, and different detection electrodes are electrically connected with different touch-detection signal lines, respectively.

In a second aspect, an electronic device is provided in the disclosure. The electronic device includes a display panel and the touch panel in the first aspect. The touch panel is carried on the display panel.

BRIEF DESCRIPTION OF THE DRAWINGS

To describe technical solutions in implementations of the disclosure more clearly, the following will give a brief introduction to accompanying drawings required for describing implementations. Apparently, the accompanying drawings hereinafter described merely illustrate some implementations of the disclosure. Based on these drawings, those of ordinary skills in the art can also obtain other drawings without creative effort.

Figure 1:
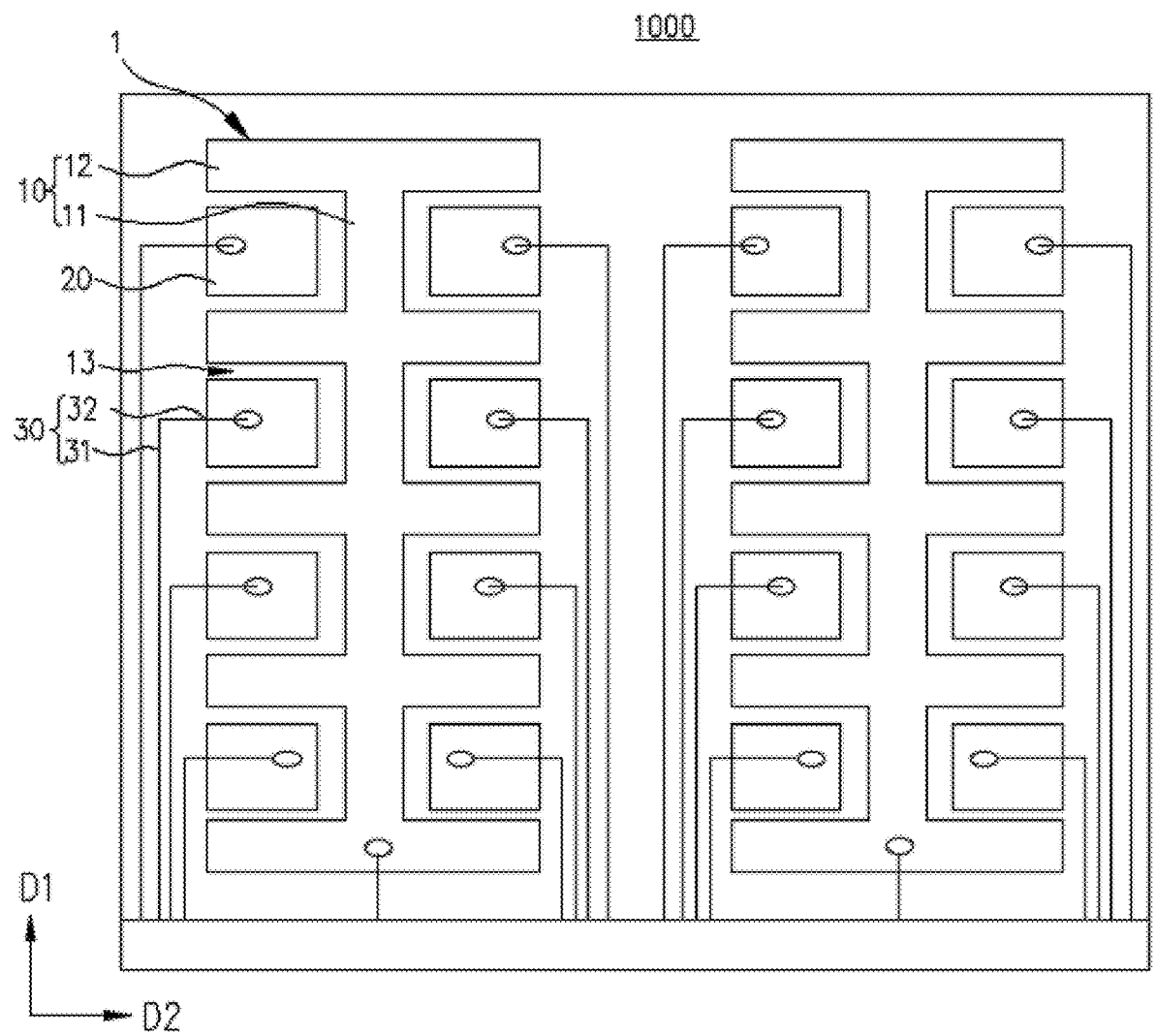
FIG. 1 is a schematic partial structural view of a touch panel provided in implementations of the disclosure.

REFERENCE SIGNS touch panel—1000, touch unit—1, driving electrode—10, first driving branch—11, second driving branch—12, first driving sub-branch—121, second driving sub-branch—122, receiving space—13, first protrusion—14, detection electrode—20, first detection electrode—201, second detection electrode—202, second protrusion—21, touch-detection signal line—30, body portion—31, connection portion—32, electrode layer—40, insulation layer—50, signal-line layer—60, protection layer—70, electronic device—300, display panel—200, Thin Film Transistor (TFT) substrate—210, carrier substrate—211, TFT array layer—212, common electrode layer—213, light-emitting layer—214, encapsulation layer—215, camera—220, hollow portion—230.

DETAILED DESCRIPTION

The following will illustrate clearly and completely technical solutions of implementations of the disclosure with reference to accompanying drawings of implementations of the disclosure. Apparently, implementations illustrated herein are merely some, rather than all implementations, of the disclosure. Based on the implementations of the disclosure, all other implementations obtained by those of ordinary skill in the art without creative effort shall fall within the protection scope of the disclosure.

The term "implementation" or "embodiment" referred to herein means that a particular feature, structure, or feature described in conjunction with the implementation or embodiment may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

It needs to be noted that the terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion.

In the specification, for sake of convenience, words and phrases indicating orientations or position relationships, such as "center", "on", "under", "front", "back", "vertical", "horizontal", "top", "bottom", "in", "out", and the like are used to illustrate position relationships of elements according to accompanying drawings and are only for the convenience of illustration of the specification and simplicity of illustration, rather than explicitly or implicitly indicate that apparatuses or components referred to herein must have a certain orientation or be configured or operated in a certain orientation and therefore cannot be understood as limitations to the disclosure. The position relationships of elements can be appropriately changed according to directions of the illustrated elements. Therefore, the position relationships are not limited to the words and phrases in the specification and can be appropriately changed according to situations.

In the specification, unless specified and limited otherwise, terms "installing", "coupling", "connecting", and the like referred to herein should be understood in broader sense, for example, may indicate a fixed coupling (connection), a detachable coupling (connection), or an integrated coupling (connection), may be a mechanical coupling (connection), an electrical coupling (connection), and may be a direct coupling (connection), an indirect coupling (connection) through a medium, or an interconnection between two components. For those of ordinary skill in the art, the above terms in the disclosure can be understood according to situations.

At present, most electronic devices can display images in response to touch operations, and touch panels, as a major application component in electronic devices, are one of important research directions in the field of touch technology.

The in-cell technology for touch panels has a significantly bright future, breaking through the conventional on-cell technology. In the in-cell technology, a touch structure is placed in a screen, so that a display panel can be further thinner. However, in most related in-cell touch solutions, a single-layer self-capacitive touch structure is adopted, and a metal layer is added for touch signal traces, resulting in that a touch panel of such self-capacitive touch structure has a low touch response speed and high power consumption. Therefore, how to improve a touch response speed of the touch panel and reduce power consumption of the touch panel becomes a technical problem to-be-solved.

A touch panel 1000 and an electronic device 300 are provided in the disclosure, which aims to solve the technical problem of how to improve a touch response speed of the touch panel and reduce power consumption of the touch panel.

Referring to FIG. 1, FIG. 1 is a schematic partial structural view of a touch panel provided in implementations of the disclosure. The touch panel 1000 includes multiple touch units 1 spaced apart from each other. Each touch unit 1 includes a driving electrode 10 and detection electrodes 20. The driving electrode 10 includes a first driving branch 11 and multiple second driving branches 12 spaced apart from each other. The multiple second driving branches 12 are connected with the first driving branch 11. Each two adjacent second driving branches 12 and the first driving branch 11 define at least one receiving space 13. Each receiving space 13 receives at least one of the detection electrodes 20. Each detection electrode 20 is electrically connected with a touch-detection signal line 30, and different detection electrodes 20 are electrically connected with different touch-detection signal lines 30, respectively, that is, the detections 20 and the touch-detection signal lines 30 are in one-to-one correspondence.

Specifically, the driving electrode 10 and the detection electrodes 20 are spaced apart from each other. The driving electrode 10 is electrically connected with a touch-driving signal line, where the touch-driving signal line is used for transmitting a driving signal to the driving electrode 10. Each detection electrode 20 is electrically connected with the touch-detection signal line 30, and different detection electrodes 20 are electrically connected with different touch-detection signal lines 30, respectively. The touch-detection signal line 30 is used for detection-signal conduction. The touch-detection signal line 30 is electrically connected with a detection chip (not illustrated in figures), where the detection chip can determine a touch position of an operator according to a detection signal. Each touch-detection signal line 30 includes a body portion 31 and a connection portion 32 that are connected in a bent manner. The connection portion 32 is electrically connected with the detection electrode 20. The body portion 31 is arranged at a side of the detection electrode 20 away from the first driving branch 11.

In the implementation, the driving electrode 10 and the detection electrodes 20 are spaced apart from each other. When a driving signal is input to the driving electrode 10 for operation, a capacitor can be formed between the driving electrode 10 and each corresponding detection electrode 20 in each receiving space 13. When an outer surface of the touch panel 1000 is touched by a finger of the operator, a capacitor is formed among the finger of the operator, the driving electrode 10, and the detection electrode 20, such that signals on the detection electrode 20 are affected, and the detection chip or the detection electrode 20 generates a detection signal.

Optionally, the driving electrode 10 includes, but is not limited to, Indium Tin Oxide (ITO), molybdenum, or other conductive materials. Similarly, the detection electrode 20 includes, but is not limited to, ITO, molybdenum, or other conductive materials.

The driving electrode 10 includes the first driving branch 11 and the multiple second driving branches 12 spaced apart from each other. The first driving branch 11 extends in a first direction D1, and each second driving branch 12 extends in a second direction D2. In the implementation, the first direction D1 is perpendicular to the second direction D2. In other implementations, the first direction D1 may also be angled relative to the second direction D2, which will not be limited herein.

Each two adjacent second driving branches 12 and the first driving branch 11 define at least one receiving space 13. Each receiving space 13 receives at least one of the detection electrodes 20. When the driving electrode 10 includes three or more second driving branches 12, there are two or more receiving spaces 13, and the two or more receiving spaces 13 are arranged in the first direction D1. Each receiving space 13 can receive at least one of the detection electrodes 20. When a driving signal is input to the driving electrode 10 for operation, a capacitor can be formed between the driving electrode 10 and each corresponding detection electrode 20 in each receiving space 13, so that each detection electrode 20 corresponding to the driving electrode 10 can detect a touch of the operator. It needs to be noted that the detection electrode 20 corresponding to the driving electrode 10 refers to the detection electrode 20 in the receiving space 13 defined by the driving electrode 10.

In the touch panel 1000 provided in the disclosure, the touch unit 1 includes the driving electrode 10 and the detection electrodes 20. Each two adjacent second driving branches 12 of the driving electrode 10 and the first driving branch 11 of the driving electrode 10 define at least one receiving space 13. Each receiving space 13 receives at least one of the detection electrodes 20. Different detection electrodes 20 are electrically connected with different touch-detection signal lines 30, respectively. When a driving signal is input to the driving electrode 10 for operation, each corresponding detection electrode 20 in each receiving space 13 can detect a touch of the operator. The detection chip can detect multiple detection electrodes 20 and the touch-detection signal lines 30. In the case where merely one driving electrode 10 is driven, the multiple detection electrodes 20 can operate, so that power consumption of the touch panel 1000 can be reduced. Furthermore, different detection electrodes 20 are electrically connected with different touch-detection signal lines 30, respectively, and each detection electrode 20 can be used for independent detection-signal conduction. In the case where a driving signal is input once to the driving electrode 10, the multiple detection electrodes 20 can cooperate with the detection chip to perform detection, so that the touch response speed of the touch panel 1000 can be improved.

Figure 2:
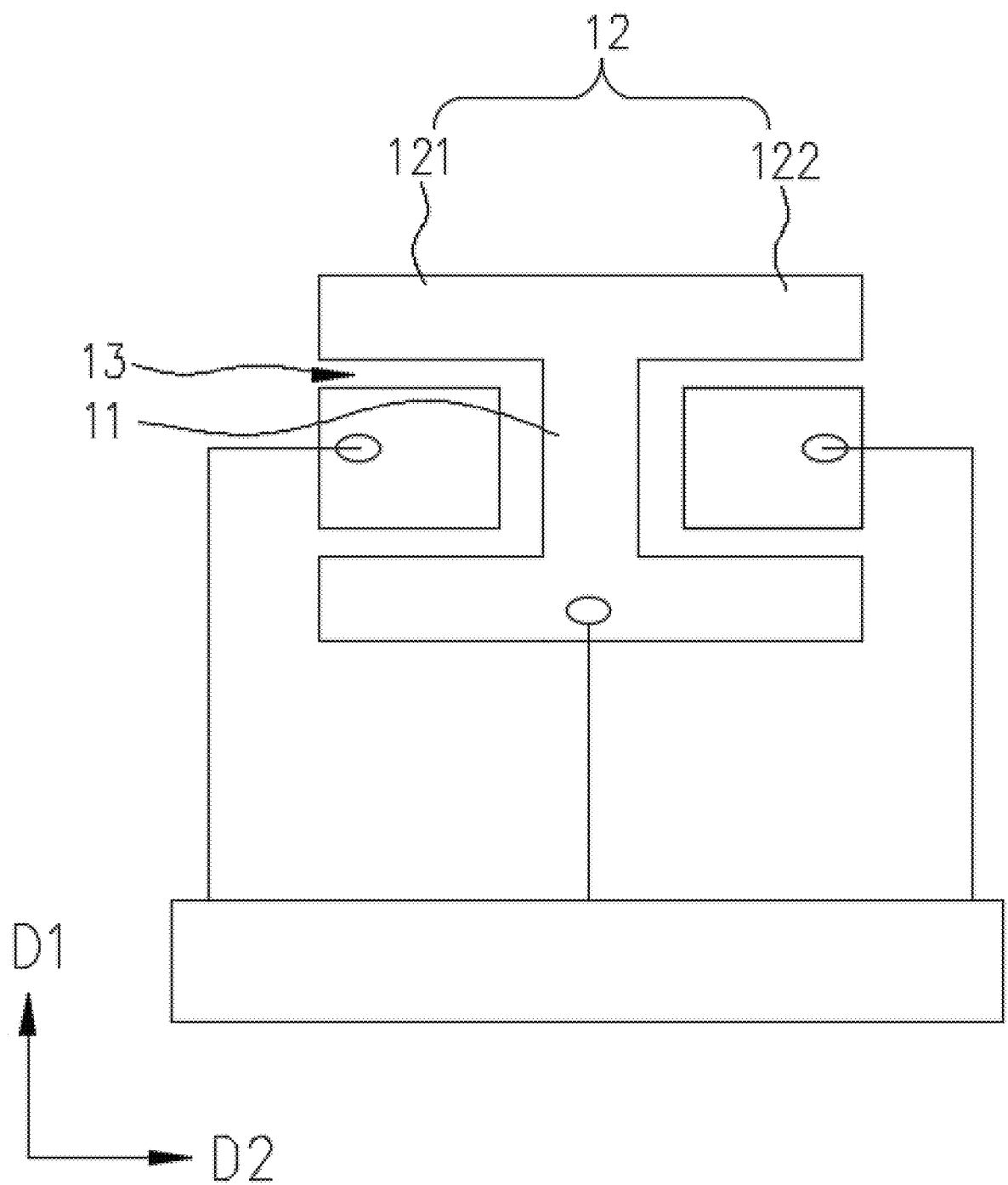
FIG. 2 is a schematic partial structural view of a touch unit provided in implementations of the disclosure.

Referring to FIGS. 1 and 2, FIG. 2 is a schematic partial structural view of a touch unit provided in implementations of the disclosure. Each two adjacent second driving branches 12 and the first driving branch 11 define two receiving spaces 13, where the two receiving spaces 13 are arranged at two opposite sides of the first driving branch 11, respectively.

Specifically, the first driving branch 11 is arranged at a central region of the second driving branch 12. In other words, the first driving branch 11 is not arranged at any one of ends of the second driving branch 12.

The first driving branch 11 is arranged at the central region of the second driving branch 12, and the first driving branch 11 and each two adjacent second driving branches 12 define two receiving spaces 13 arranged in the second direction D2. Each receiving space 13 can receive at least one of the detection electrodes 20. When a driving signal is input to the driving electrode 10 for operation, two corresponding detection electrodes 20 arranged in the second direction D2 in a certain region each can operate and can detect a touch of the operator, so that the touch response speed of the touch panel 1000 can be improved.

Referring to FIGS. 1 and 2, specifically, each second driving branch 12 includes a first driving sub-branch 121 and a second driving sub-branch 122. The first driving sub-branch 121 and the second driving sub-branch 122 are arranged at two opposite sides of the first driving branch 11, respectively. First driving sub-braches of different second driving branches 12 are arranged at one side of the first driving branch 11, and second driving sub-braches of different second driving branches 12 are arranged at the other side of the first driving branch 11. Each two adjacent first driving sub-branches 121 and the first driving branch 11 define a receiving space 13, and each two adjacent second driving sub-branches 122 and the first driving branch 11 define a receiving space 13.

In other words, the first driving branch 11 is arranged at the central region of the second driving branch 12 and divides the second driving branch 12 into the first driving sub-branch 121 and the second driving sub-branch 122. The first driving sub-branch 121 extends in a direction opposite to a direction in which the second driving sub-branch 122 extends.

Figure 3:
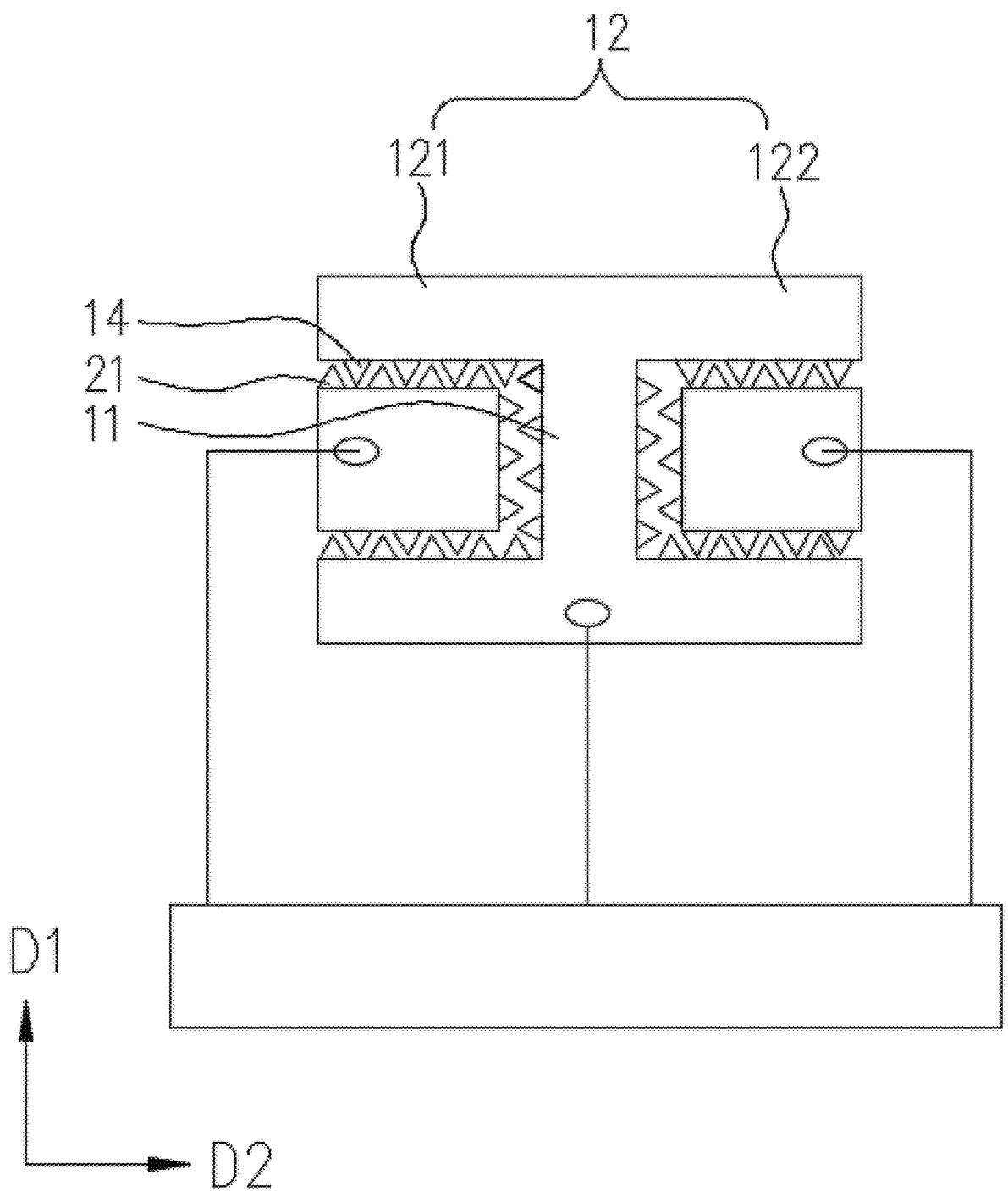
FIG. 3 is a schematic partial structural view of a touch unit provided in implementations of the disclosure.

Referring to FIGS. 1, 2, and 3, FIG. 3 is a schematic partial structural view of a touch unit provided in implementations of the disclosure. In the implementation, the driving electrode 10 has multiple first protrusions 14 at an edge facing the detection electrodes 20, where the multiple first protrusions 14 are spaced apart from each other. Each detection electrode 20 has multiple second protrusions 21 at an edge facing the driving electrode 10, where the second protrusions 21 are spaced apart from each other. At least part of the second protrusions 21 satisfies the following: each of the at least part of the second protrusions 21 is arranged between two adjacent first protrusions 14 and is spaced apart from the first protrusions 14. At least part of the first protrusions 14 satisfies the following: each of the at least part of the first protrusions 14 is arranged between two adjacent second protrusions 21 and is spaced apart from the second protrusions 21.

Specifically, in the implementation, the driving electrode 10 has the multiple first protrusions 14 at the edge facing the detection electrodes 20. That is, the edge of the driving electrode 10 facing the detection electrode 20 is serrated, and the first protrusions 14 are tips of the serrated edge of the driving electrode 10. The detection electrode 20 has the multiple second protrusions 21 at the edge facing the driving electrode 10, and the second protrusions 21 are tips of the serrated edge of the detection electrode 20. Optionally, in other implementations, the edge of the driving electrode 10 facing the detection electrode 20 may be wavy, and the first protrusions 14 are curved protrusions. The edge of the detection electrode 20 facing the driving electrode 10 may also be wavy, and the second protrusions 21 are curved protrusions. The edge of the driving electrode 10 facing the detection electrode 20 and the edge of the detection electrode 20 facing the driving electrode 10 may be in the same shape or different shapes, which will not be limited herein.

The driving electrode 10 has the multiple first protrusions 14 at the edge facing the detection electrodes 20, and the detection electrode 20 has the multiple second protrusions 21 at the edge facing the driving electrode 10. As such, a corresponding size between the driving electrode 10 and the detection electrode 20 can be increased, and a capacitance between the detection electrode 20 and the driving electrode 10 corresponding to the detection electrode 20 can be increased, thereby improving the touch response speed of the touch panel 1000.

The driving electrode 10 and the detection electrodes 20 are arranged at a same layer. The touch-detection signal line 30 is arranged at a layer different from a layer where the driving electrode 10 and the detection electrodes 20 are arranged. As such, interference on current on the driving electrode 10 and the detection electrodes 20 by an electrical signal on the touch-detection signal lines 30 can be avoided, thereby improving detection efficiency and accuracy of the touch panel 1000.

Figure 4:
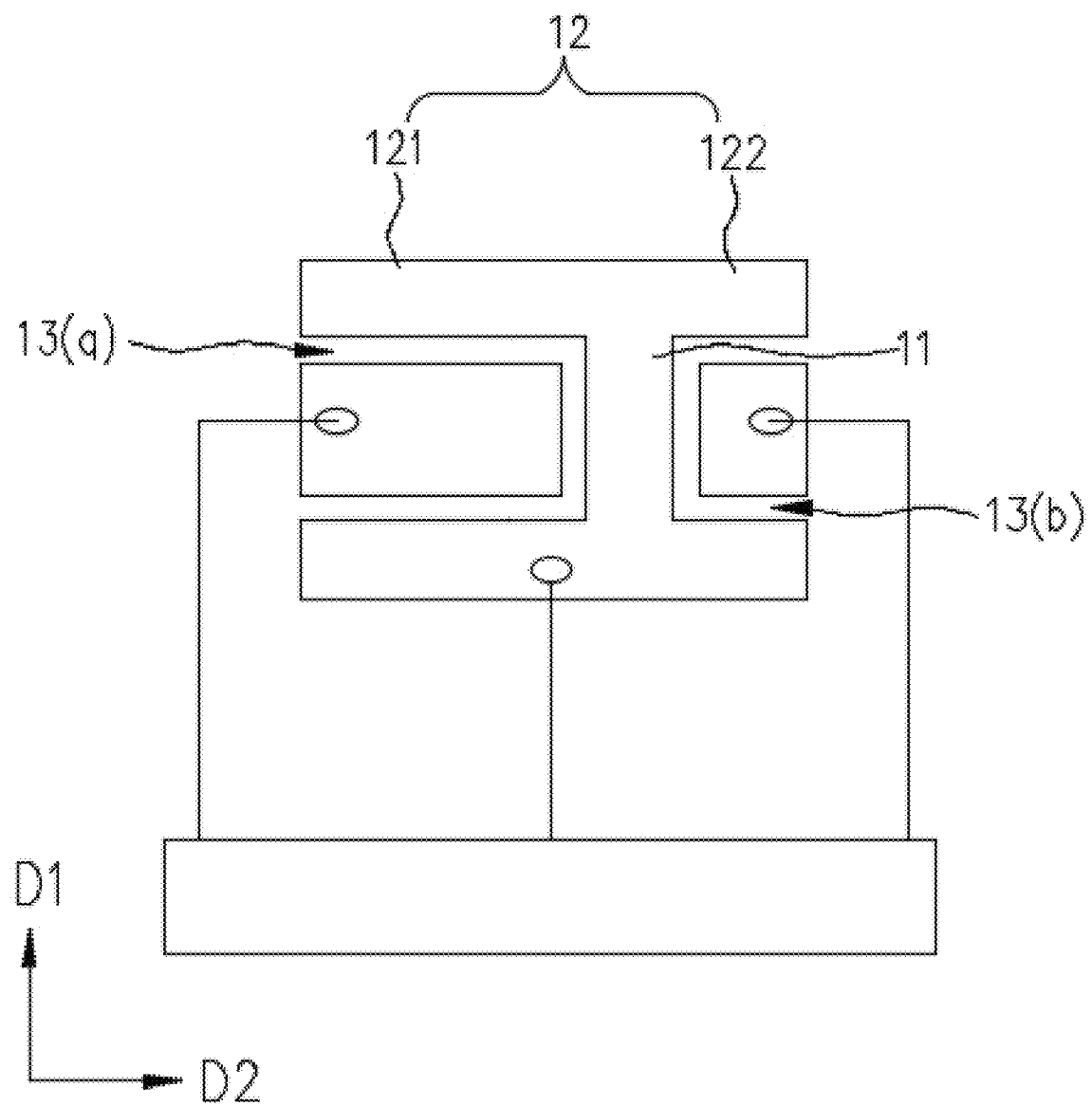
FIG. 4 is a schematic partial structural view of a touch unit provided in implementations of the disclosure.

Referring to FIG. 4, FIG. 4 is a schematic partial structural view of a touch unit provided in implementations of the disclosure. In the implementation, the first driving branch 11 is not arranged at the central region of the second driving branch 12. In other words, the first driving branch 11 and each two adjacent second driving branches 12 can define two differently-sized receiving spaces 13 arranged in the second direction D2. In the implementation, a receiving space 13 (marked as 13(*a*) for convenience) defined by the first driving branch 11 and two adjacent first driving sub-branches 121 is larger than a receiving space 13 (marked as 13(*b*) for convenience) defined by the first driving branch 11 and two adjacent second driving sub-branches 122. In other implementations, the receiving space 13 defined by the first driving branch 11 and the two adjacent second driving sub-branches 122 may be larger than the receiving space 13 defined by the first driving branch 11 and the two adjacent first driving sub-branches 121, which will not be limited herein.

In the implementation, for example, the receiving space 13 defined by the first driving branch 11 and the two adjacent first driving sub-branches 121 is larger than the receiving space 13 defined by the first driving branch 11 and the two adjacent second driving sub-branches 122. That is, a detection electrode 20 between the two adjacent first driving sub-branches 121 may be larger than a detection electrode 20 between the two adjacent second driving sub-branches 122 in size.

Figure 5:
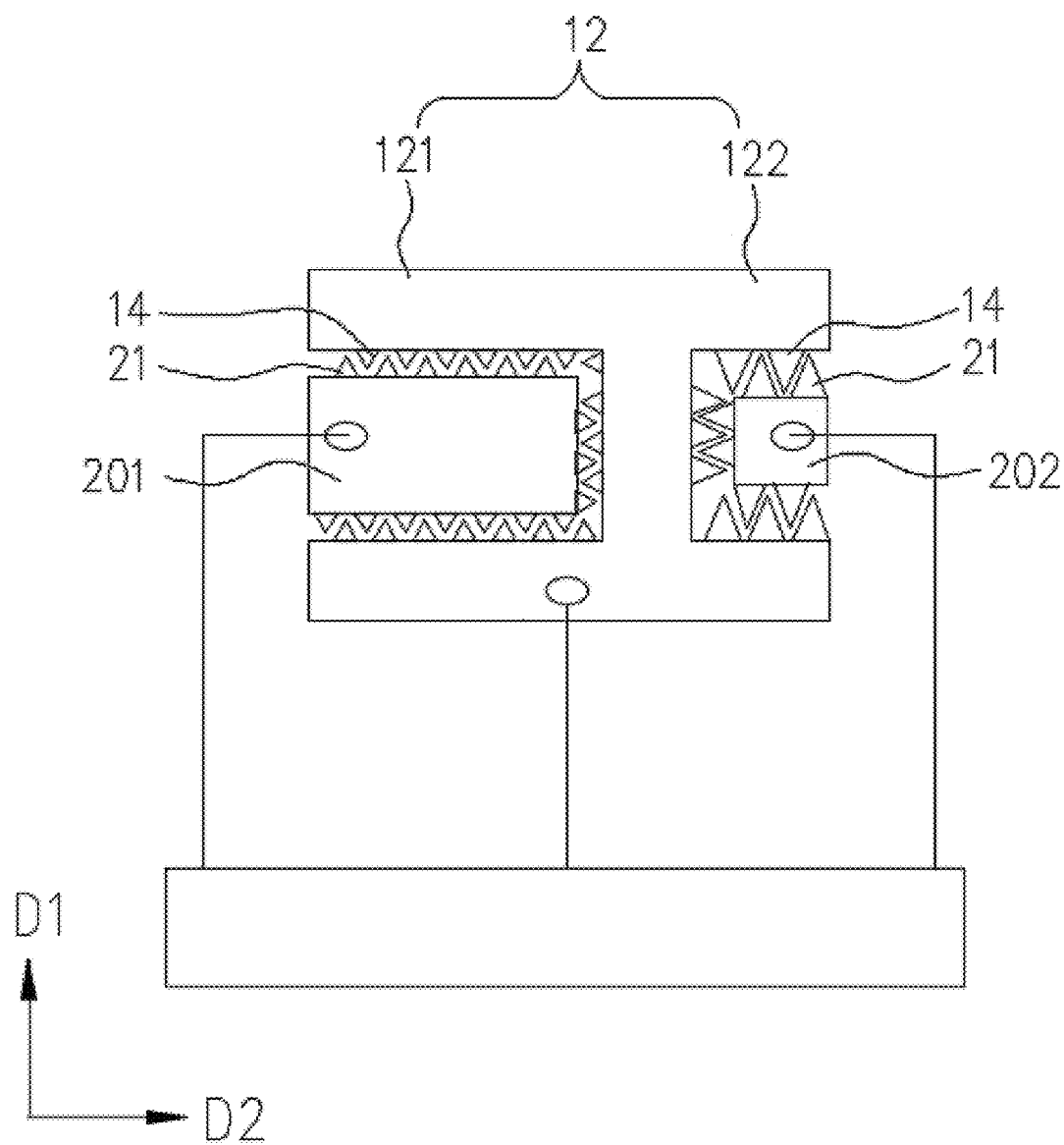
FIG. 5 is a schematic partial structural view of a touch unit provided in implementations of the disclosure.

Referring to FIG. 5, FIG. 5 is a schematic partial structural diagram of a touch unit provided in implementations of the disclosure. The detection electrode 20 between two adjacent first driving sub-branches 121 is a first detection electrode 201, and the detection electrode 20 between two adjacent second driving sub-branches 122 is a second detection electrode 202. To ensure that detection accuracy of the first detection electrode 201 is equal or approximately equal to the detection accuracy of the second detection electrode 202, the first protrusion 14 of the second driving sub-branch 122 and the second protrusion 21 of the second detection electrode 202 can be increased in size in the first direction D1. In other words, the second protrusion 21 of the second detection electrode 202 extends into a gap between two adjacent first protrusions 14 of the second driving sub-branch 122 by a first depth, the second protrusion 21 of the first detection electrode 201 extends into a gap between two adjacent first protrusions 14 of the first driving sub-branch 121 by a second depth, and the first depth is greater than the second depth, so that detection accuracy can be further improved.

Figure 6:
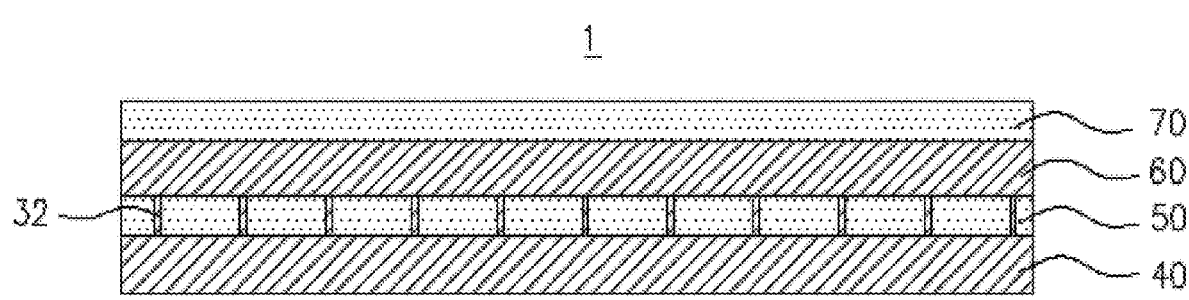
FIG. 6 is a schematic cross-sectional structural view of the touch unit illustrated in FIG. 1.

Referring to FIGS. 1, 2, and 6, FIG. 6 is a schematic cross-sectional structural view of the touch unit illustrated in FIG. 1. Each touch unit 1 includes an electrode layer 40, an insulation layer 50, a signal-line layer 60, and a protection layer 70 arranged in sequence. The driving electrode 10 and the detection electrodes 20 are arranged at the electrode layer 40. The body portion 31 of the touch-detection signal line 30 is arranged at the signal-line layer 60. The connection portion 32 of the touch-detection signal line 30 is partially arranged at the signal-line layer 60, partially passes through the insulation layer 50, and is connected with the detection electrode 20.

Optionally, the insulation layer 50 is made of a material including, but not limited to, an organic insulation material, an inorganic insulation material, or a mixed insulation material such as silica or silicon nitride, etc. The signal-line layer 60 is made of a material including, but not limited to, metal, ITO, or other types of conductive materials.

The insulation layer 50 is arranged between the electrode layer 40 and the signal-line layer 60 to avoid that the touch-detection signal line 30 contacts the detection electrode 20 and the driving electrode 10, thereby avoiding crosstalk or other phenomena.

The protection layer 70 is disposed on the signal-line layer 60. The protection layer 70 can be configured to make an outer surface of the touch unit 1 smoother, and can be configured to prevent moisture in the air from entering the inside of the touch unit 1, thereby preventing erosion occurring at the electrode layer 40 and the signal-line layer 60.

Figure 7:
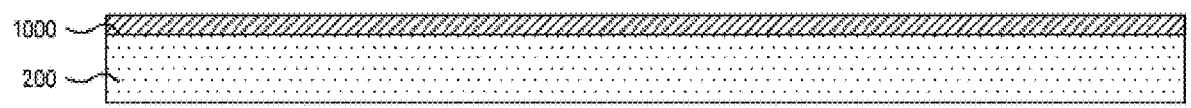
FIG. 7 is a schematic cross-sectional structural view of an electronic device provided in implementations of the disclosure.

Referring to FIG. 7, FIG. 7 is a schematic cross-sectional structural view of an electronic device provided in implementations of the disclosure. An electronic device 300 is further provided in the disclosure. The electronic device 300 includes a display panel 200 and the touch panel 1000. The touch panel 1000 is carried on the display panel 200. It needs to be noted that the touch panel 1000 being carried on the display panel 200 includes, but is not limited to, the touch panel 1000 being disposed on an outer surface or an inner surface of the display panel 200 or being embedded in the display panel 200. In the disclosure, for example, the touch panel 1000 is embedded in the display panel 200, which should not be understood as a limit to the disclosure.

Optionally, the electronic device 300 includes, but is not limited to, a notebook, a mobile phone, a display screen, or other devices. The display panel 200 is configured to emit lights and display images, and the touch panel 1000 is carried on the display panel 200 for convenient operation and control of images by an operator.

Figure 8:
FIG. 8 is a schematic cross-sectional structural view of an electronic device provided in implementations of the disclosure.

Referring to FIGS. 1, 7, and 8, FIG. 8 is a schematic cross-sectional structural view of an electronic device provided in implementations of the disclosure. In the implementation, the display panel 200 is a Liquid Crystal Display (LCD) panel, and the LCD panel includes a Thin Film Transistor (TFT) substrate 210. The TFT substrate 210 includes a carrier substrate 211, a TFT array layer 212, and a common electrode layer 213. The TFT array layer 212 and the common electrode layer 213 are carried on the carrier substrate 211, and the common electrode layer 213 is farther away from the carrier substrate 211 than the TFT array layer 212. The multiple touch units 1 are formed at the common electrode layer 213.

Specifically, the TFT array layer 212 is a TFT array layer, and the TFT array layer 212 is configured to control light emitting of the display panel 200.

In the implementation, the carrier substrate 211 may be a flexible substrate. Optionally, the carrier substrate 211 may be made of any one or more of: polyimide, Polyethylene Terephthalate (PET), Polyethylene Naphthalate Two Formic Acid Glycol Ester (PEN), Cyclo-olefinpolymer (COP), Polycarbonate (PC), Polystyrene (PS), Polypropylene (PP), Polytetrafluoroethylene (PTFE). In other implementations, the carrier substrate 211 may also be a non-flexible substrate, such as made of glass, ceramic, etc., which will not be limited herein.

Optionally, the display panel 200 includes, but is not limited to, an In-Plane-Switching (IPS) display panel, a Vertical Alignment (VA) display panel, a Twisted Nematic (TN) display panel, or other types of display panels.

Figure 9:
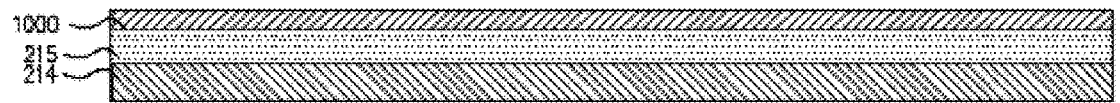
FIG. 9 is a schematic cross-sectional structural view of an electronic device provided in implementations of the disclosure.

Referring to FIGS. 1, 7, and 9, FIG. 9 is a schematic cross-sectional structural view of an electronic device provided in implementations of the disclosure. In the implementation, the display panel 200 is an Organic Light- Emitting Diode (OLED) display panel, where the OLED display panel includes a light-emitting layer 214 and an encapsulation layer 215. The encapsulation layer 215 is configured to encapsulate the light-emitting layer 214, and the multiple touch units 1 of the touch panel 1000 are carried at the encapsulation layer 215.

The encapsulation layer 215 is made of a material including, but not limited to, a nitrogen silicon compound, a nitrogen oxide compound, or other materials with a good sealing performance. The encapsulation layer 215 is configured to encapsulate the light-emitting layer 214 to prevent the light-emitting layer 214 from erosion of external water and oxygen, thereby avoiding adversely effect on light emitting of the light-emitting layer 214.

Figure 10:
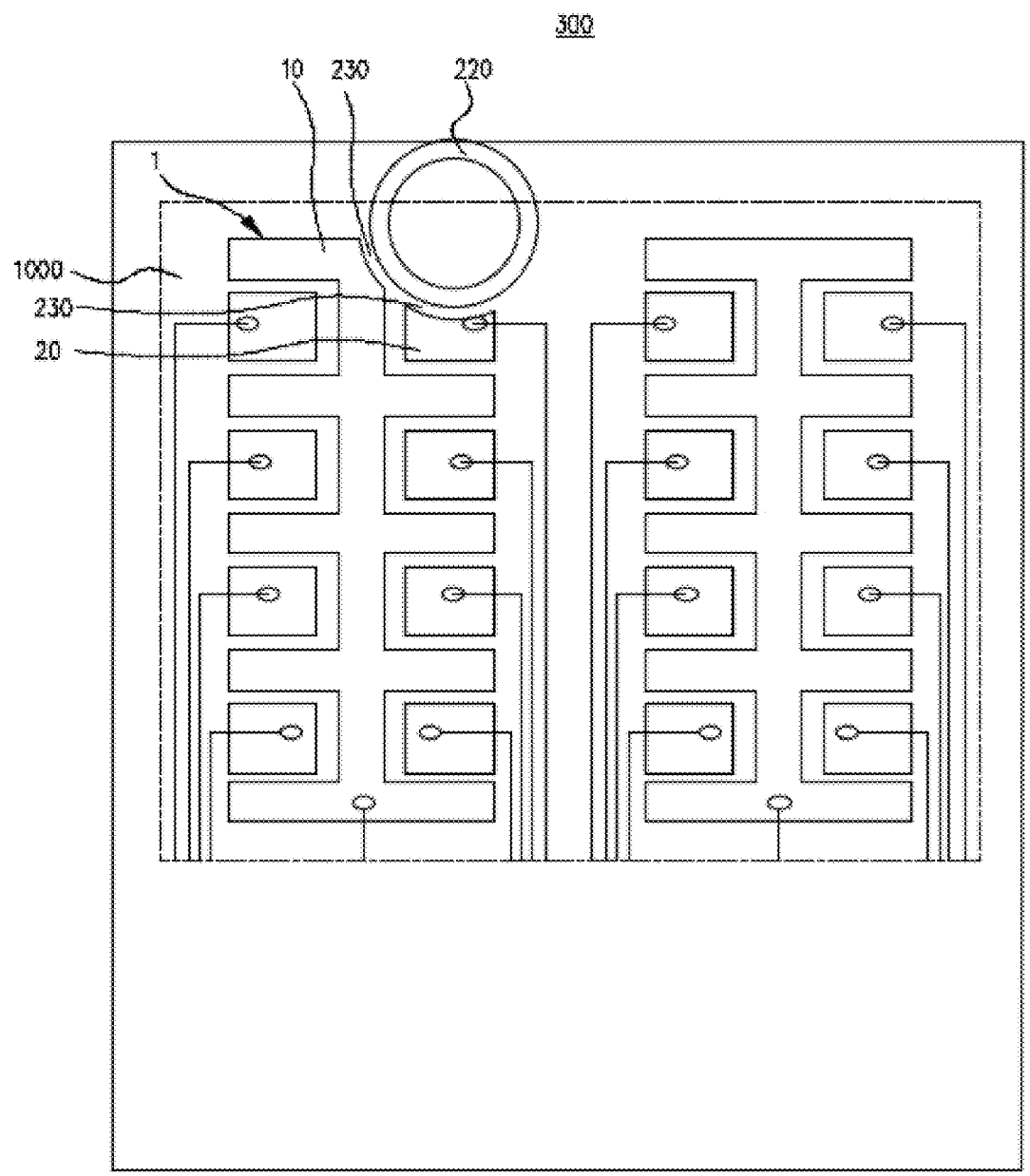
FIG. 10 is a schematic structural view of a touch panel of an electronic device with a camera provided in implementations of the disclosure.
Figure 11:
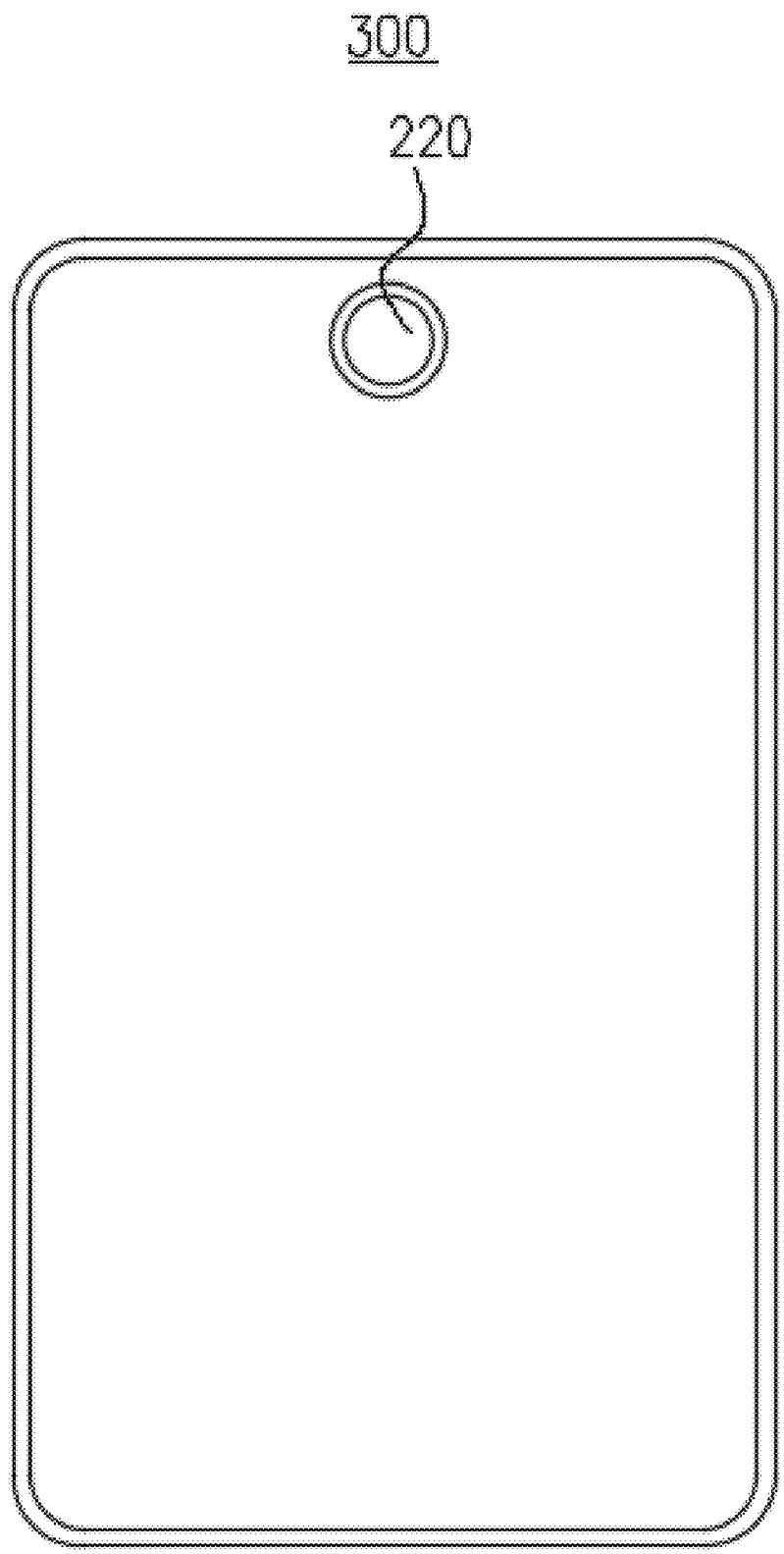
FIG. 11 is a schematic structural view illustrating an appearance of the electronic device illustrated in FIG. 10.

Referring to FIGS. 1, 10, and 11, FIG. 10 is a schematic structural diagram of a touch panel of an electronic device with a camera provided in implementations of the disclosure, and FIG. 11 is a schematic structural diagram of an appearance of the electronic device illustrated in FIG. 10. In the implementation, the electronic device 300 further includes a camera 220. At least part of the driving electrode 10 and/or the detection electrode 20 defines a hollow portion 230, where the camera 220 is disposed corresponding to the hollow portion 230.

In the implementation, the detection electrode 20 defines the hollow portion 230, and the camera 220 is disposed corresponding to the hollow portion 230 to prevent the detection electrode 20 from adversely affecting normal operation of the camera 220.

Optionally, in other implementations, the driving electrode 10 may define the hollow portion 230, and the camera 220 is disposed corresponding to the hollow portion 230. Alternatively, the detection electrode 20 defines a hollow portion 230 and the driving electrode 10 defines a hollow portion 230, and the camera 220 is disposed corresponding to the hollow portion 230 of the detection electrode 20 and the hollow portion 230 of the driving electrode 10.

It needs to be noted that the camera 220 being disposed corresponding to the hollow portion 230 means that an orthogonal projection of the camera 220 at least partially overlaps an orthogonal projection of the hollow portion 230.

Figure 12:
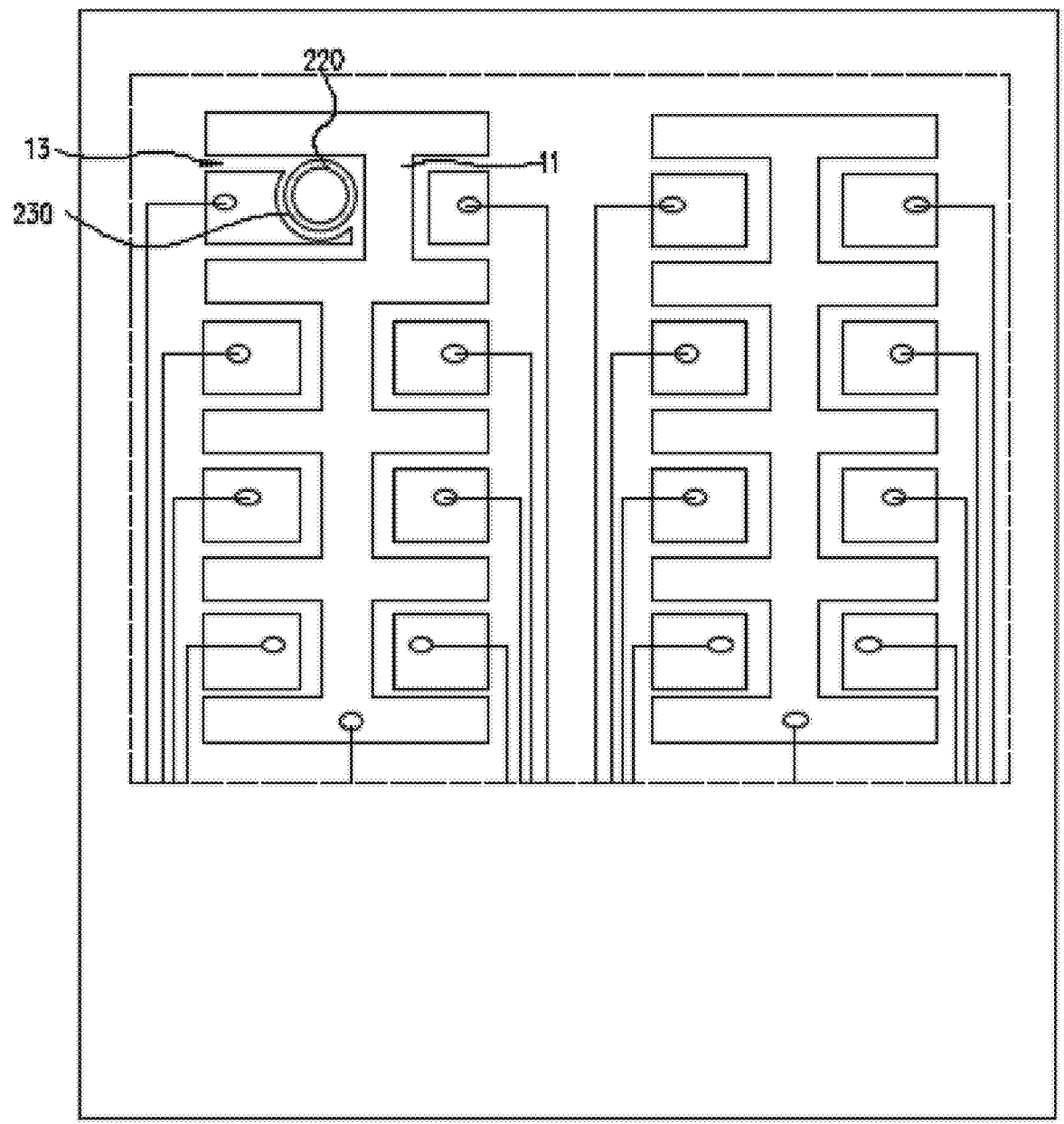
FIG. 12 is a schematic structural view of a touch panel of an electronic device with a camera provided in implementations of the disclosure.

Referring to FIG. 12, FIG. 12 is a schematic structural diagram of a touch panel of an electronic device with a camera provided in implementations of the disclosure. In other implementations, if the first driving branch 11 may not be arranged at the central region of the second driving branch 12, the receiving space 13 can receive a detection electrode 20 with a relatively large size, and the camera 220 can be disposed in a hollow portion 230 of the detection electrode 20, which ensures that the driving electrode 10 is not affected. In the disclosure, the first driving branch 11 is not arranged at the central region of the second driving branch 12 only in the vicinity of the camera 220. In other implementations, all first driving branches 11 of the entire touch panel 1000 may not be arranged at the central region of the second driving branches 12, which will not be limited herein.

Figure 13:
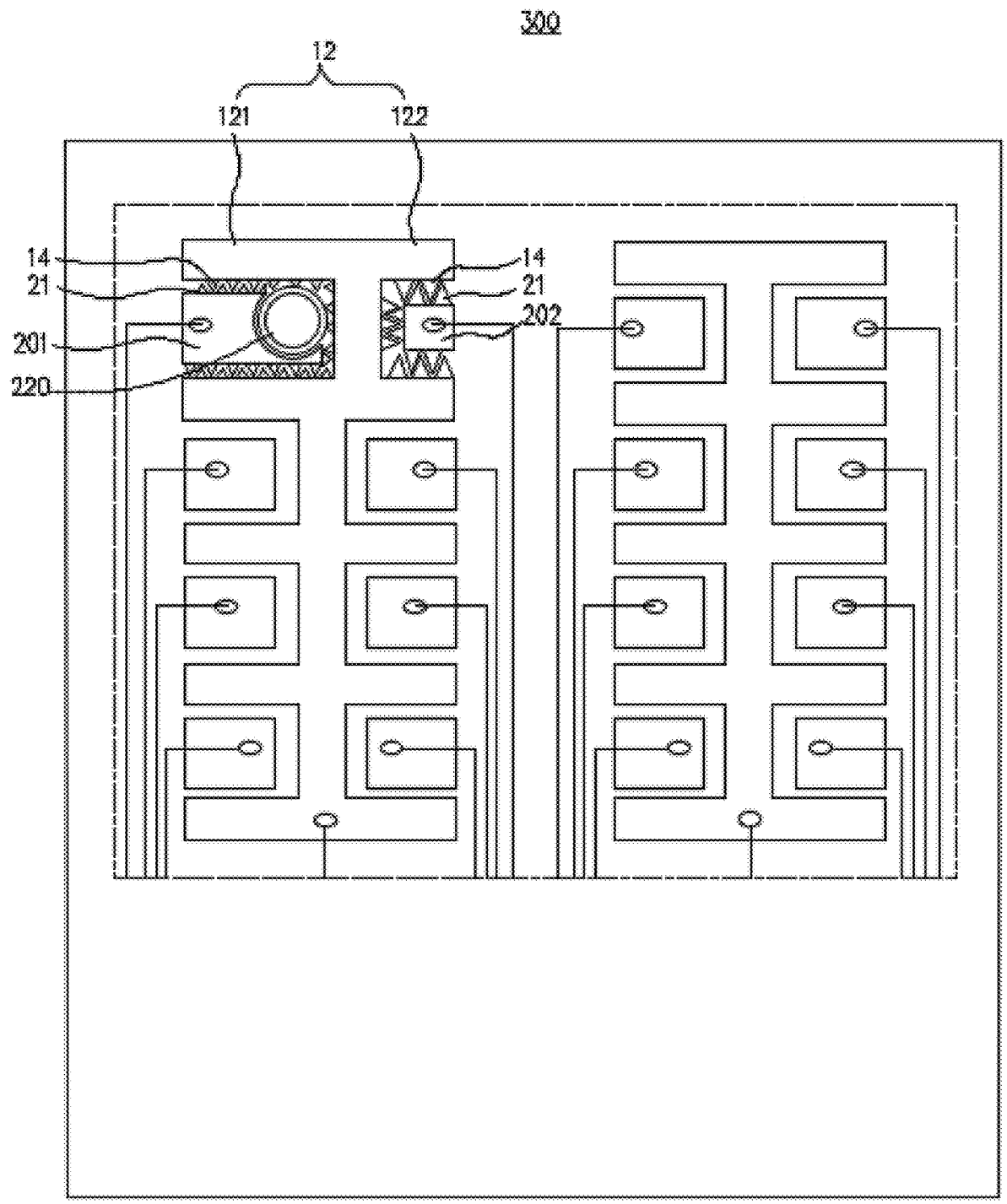
FIG. 13 is a schematic structural view of a touch panel of an electronic device with a camera provided in implementations of the disclosure.

Referring to FIG. 13, FIG. 13 is a schematic structural diagram of a touch panel of an electronic device with a camera provided in implementations of the disclosure. In the implementations, the detection electrode 20 is provided with the hollow portion 230 and can also be correspondingly provided with the second protrusions 21, so that detection accuracy of the detection electrode 20 can be improved.

The above are some implementations of the disclosure. It should be pointed out that for those of ordinary skill in the art, without departing from principles of the disclosure, several improvements and refinements can also be made. These improvements and refinements are also considered to fall within the scope of protection of the disclosure.

What is claimed is:

1. A touch panel, comprising a plurality of touch units spaced apart from each other, each of the plurality of the touch units comprising:
    a driving electrode comprising a first driving branch and a plurality of second driving branches spaced apart from each other, wherein the plurality of second driving branches are connected with the first driving branch, and each two adjacent second driving branches in the plurality of second driving branches and the first driving branch define at least one receiving space; and
    detection electrodes, wherein each receiving space receives at least one of the detection electrodes, each of the detection electrodes is electrically connected with a touch-detection signal line, and different detection electrodes are electrically connected with different touch-detection signal lines, respectively,
    wherein
    each two adjacent second driving branches in the plurality of second driving branches and the first driving branch define two receiving spaces,
    the two receiving spaces are arranged at two opposite sides of the first driving branch, respectively,
    the two receiving spaces arranged at the two opposite sides of the first driving branch are different in size, and
    the detection electrodes received in the two receiving spaces arranged at the two opposite sides of the first driving branch are different in size.

2. The touch panel of claim 1, wherein each of the plurality of second driving branches comprises a first driving sub-branch and a second driving sub-branch, wherein
    the first driving sub-branch and the second driving sub-branch are arranged at the two opposite sides of the first driving branch, respectively, first driving sub-branches of different second driving branches are arranged at one side of the first driving branch, and second driving sub-branches of different second driving branches are arranged at the other side of the first driving branch, each two adjacent first driving sub-branches and the first driving branch define a receiving space, and each two adjacent second driving sub-branches and the first driving branch define a receiving space.

3. The touch panel of claim 1, wherein the first driving branch is arranged at a middle region of each of the plurality of second driving branches.

4. The touch panel of claim 1, wherein
    the driving electrode has a plurality of first protrusions at an edge facing the detection electrode, wherein the plurality of first protrusions are spaced apart from each other; and
    each of the detection electrodes has a plurality of second protrusions at an edge facing the driving electrode, wherein the second protrusions are spaced apart from each other; wherein
    each of at least part of the second protrusions of the detection electrode in the smaller of the two receiving spaces extends into a gap between two adjacent first protrusions of the driving electrode by a first depth, and each of at least part of the second protrusions of the detection electrode in the larger of the two receiving spaces extends into a gap between two adjacent first protrusions of the driving electrode by a second depth, where the first depth is greater than the second depth.

5. The touch panel of claim 1, wherein
the driving electrode has a plurality of first protrusions at an edge facing the detection electrodes, wherein the plurality of first protrusions are spaced apart from each other; and
each of the detection electrodes has a plurality of second protrusions at an edge facing the driving electrode, wherein the second protrusions are spaced apart from each other; wherein
at least part of the second protrusions satisfies the following: each of the at least part of the second protrusions is arranged between two adjacent first protrusions and is spaced apart from the first protrusions, and at least part of the first protrusions satisfies the following: each of the at least part of the first protrusions is arranged between two adjacent second protrusions and is spaced apart from the second protrusions.

6. The touch panel of claim 1, wherein each touch-detection signal line comprises a body portion and a connection portion that are connected in a bent manner, wherein the connection portion is electrically connected with the detection electrode, and the body portion is arranged at a side of the detection electrode away from the first driving branch.

7. The touch panel of claim 6, wherein each of the plurality of touch units comprises an electrode layer, an insulation layer, a signal-line layer, and a protection layer arranged in sequence, wherein
the driving electrode and the detection electrodes are arranged at the electrode layer, and the body portion of the touch-detection signal line is arranged at the signal-line layer, and the connection portion of the touch-detection signal line is partially arranged at the signal-line layer, partially passes through the insulation layer, and is connected with the detection electrode.

8. The touch panel of claim 1, wherein the driving electrode and the detection electrodes are arranged at a same layer, and the touch-detection signal line is arranged at a layer different from a layer where the driving electrode and the detection electrodes are arranged.

9. The touch panel of claim 1, wherein at least one of the driving electrode or the detection electrode defines a hollow portion for arrangement of a camera of an electronic device comprising the touch panel.

10. An electronic device, comprising:
a display panel; and
a touch panel carried on the display panel and comprising a plurality of touch units spaced apart from each other, and each of the plurality of the touch units comprising:
a driving electrode comprising a first driving branch and a plurality of second driving branches spaced apart from each other, wherein the plurality of second driving branches are connected with the first driving branch, and each two adjacent second driving branches in the plurality of second driving branches and the first driving branch define at least one receiving space; and
detection electrodes, wherein each receiving space receives at least one of the detection electrodes, each of the detection electrodes is electrically connected with a touch-detection signal line, and different detection electrodes are electrically connected with different touch-detection signal lines, respectively,
wherein
each two adjacent second driving branches in the plurality of second driving branches and the first driving branch define two receiving spaces, the two receiving spaces are arranged at two opposite sides of the first driving branch, respectively,
the two receiving spaces arranged at the two opposite sides of the first driving branch are different in size, and
the detection electrodes received in the two receiving spaces arranged at the two opposite sides of the first driving branch are different in size.

11. The electronic device of claim 10, wherein
the display panel is a Liquid Crystal Display (LCD) panel, and the LCD panel comprises a Thin Film Transistor (TFT) substrate, wherein the TFT substrate comprises a carrier substrate, a TFT array layer, and a common electrode layer, wherein the TFT array layer and the common electrode layer are carried on the carrier substrate, and the common electrode layer is farther away from the carrier substrate than the TFT array layer, and the plurality of touch units are formed at the common electrode layer; or
the display panel is an Organic Light-Emitting Diode (OLED) display panel, wherein the OLED display panel comprises a light-emitting layer and an encapsulation layer, wherein the encapsulation layer is configured to encapsulate the light-emitting layer, and the plurality of touch units are carried at the encapsulation layer.

12. The electronic device of claim 10, wherein the electronic device further comprises a camera, and at least one of the driving electrode or the detection electrode defines a hollow portion, wherein the camera is disposed corresponding to the hollow portion.

13. The electronic device of claim 12, wherein the first driving branch is unarranged at a middle region of second driving branches adjacent to the hollow portion.

14. The electronic device of claim 12, wherein
the detection electrode defines the hollow portion and has a plurality of second protrusions at an edge facing the driving electrode, wherein the plurality of second protrusions are spaced apart from each other; and
the driving electrode has a plurality of first protrusions at an edge facing the detection electrode, wherein the plurality of first protrusions are spaced apart from each other; wherein
each of at least part of the plurality of first protrusions is arranged between two adjacent second protrusions.

15. The electronic device of claim 10, wherein the first driving branch is arranged at a middle region of each of the plurality of second driving branches.

16. The electronic device of claim 10, wherein
the driving electrode has a plurality of first protrusions at an edge facing the detection electrodes, wherein the plurality of first protrusions are spaced apart from each other; and
each of the detection electrodes has a plurality of second protrusions at an edge facing the driving electrode, wherein the second protrusions are spaced apart from each other;
wherein
at least part of the second protrusions satisfies the following: each of the at least part of the second protrusions is arranged between two adjacent first protrusions and is spaced apart from the first protrusions, and
at least part of the first protrusions satisfies the following: each of the at least part of the first protrusions is arranged between two adjacent second protrusions and is spaced apart from the second protrusions.

17. The electronic device of claim 10, wherein
the driving electrode has a plurality of first protrusions at an edge facing the detection electrode, wherein the plurality of first protrusions are spaced apart from each other; and
each of the detection electrodes has a plurality of second protrusions at an edge facing the driving electrode, wherein the second protrusions are spaced apart from each other; wherein
each of at least part of the second protrusions of the detection electrode in the smaller of the two receiving spaces extends into a gap between two adjacent first protrusions of the driving electrode by a first depth, and each of at least part of the second protrusions of the detection electrode in the larger of the two receiving spaces extends into a gap between two adjacent first protrusions of the driving electrode by a second depth, where the first depth is greater than the second depth.

18. The electronic device of claim 10, wherein each touch-detection signal line comprises a body portion and a connection portion that are connected in a bent manner, wherein the connection portion is electrically connected with the detection electrode, and the body portion is arranged at a side of the detection electrode away from the first driving branch.

19. The electronic device of claim 18, wherein each of the plurality of touch units comprises an electrode layer, an insulation layer, a signal-line layer, and a protection layer arranged in sequence, wherein
the driving electrode and the detection electrodes are arranged at the electrode layer, and the body portion of the touch-detection signal line is arranged at the signal-line layer, and the connection portion of the touch-detection signal line is partially arranged at the signal-line layer, partially passes through the insulation layer, and is connected with the detection electrode.

20. The electronic device of claim 10, wherein the driving electrode and the detection electrodes are arranged at a same layer, and the touch-detection signal line is arranged at a layer different from a layer where the driving electrode and the detection electrodes are arranged.

* * * * *